Sept. 11, 1951 A. B. JACOBSEN 2,567,846

PULSE CODING CIRCUIT

Filed Aug. 1, 1945

INVENTOR

ANDREW B. JACOBSEN

BY William D. Hall

ATTORNEY

Patented Sept. 11, 1951 2,567,846

UNITED STATES PATENT OFFICE 2,567,846

PULSE CODING CIRCUIT

Andrew B. Jacobsen, Somerville, Mass., assignor, by mesne assignments, to the United States of America as represented by the Secretary of War Application August 1, 1945, Serial No. 608,308

9 Claims. (Cl. 177—380)

This invention relates in general to electrical circuits and more particularly to those circuits designed to produce a series of voltage pulses in a predetermined sequence or code.

In many applications of radio apparatus it is desirable to transmit electromagnetic energy in a series of pulses of short duration. Hence, it is necessary to provide means for generating a modulating voltage which will turn a radio frequency oscillator on and off under the control of the modulating voltage. On many occasions it is sufficient for the modulating voltage to consist of rectangular pulses spaced at equal intervals but often it is desired to space the pulses in groups, the exact arrangement of pulses within a group being determined by a predetermined code.

Accordingly it is one object of my invention to provide a circuit for producing voltage pulses in a predetermined sequence.

Another object is to provide voltage pulses which may be adapted for modulation of a radio frequency signal.

Still another object is to provide a circuit capable of developing from a single triggering impulse a series of further voltage pulses in variable time relation to one another.

These and further objects of my invention will be apparent to those skilled in the art upon reference to the following specification, claims and drawings in which:

Briefly, the invention utilizes a plurality of delay multivibrators having single stable states of conduction, each of which produces, upon triggering, a single voltage pulse of a predetermined duration. The outputs of the individual multivibrators are passed through a pulse transformer and combined in an output stage to produce a series of pulses, the sequence of which depends upon the duration of each individual multivibrator output.

Figure 1:
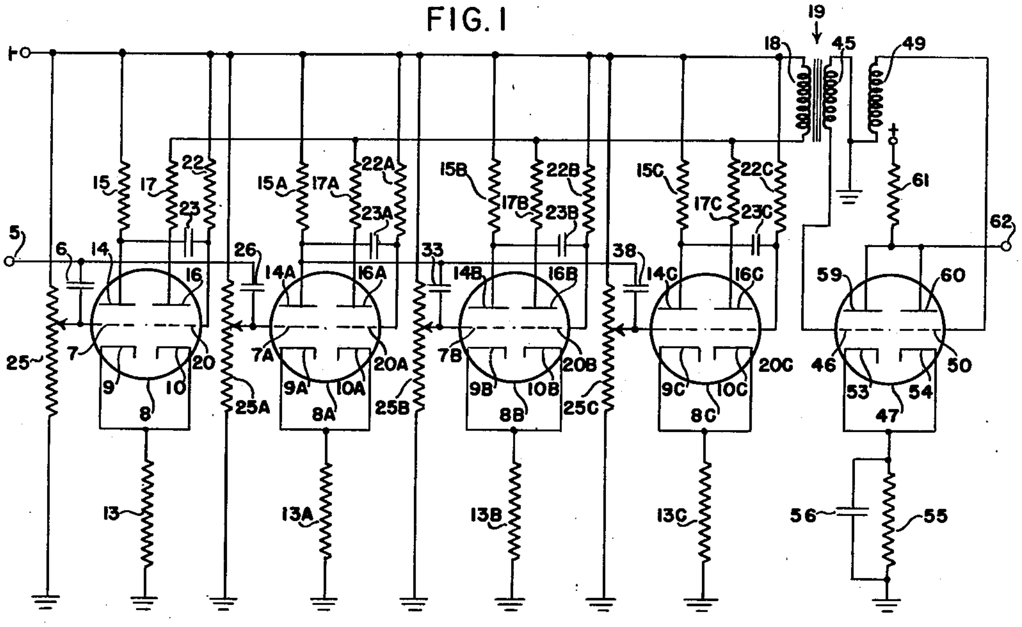
Fig. 1 is a circuit diagram of one embodiment of my invention.

Referring now to Fig. 1, one embodiment of my invention which utilizes four similar delay multivibrators is shown. Input terminal 5 is connected through capacitor 6 to grid 7 of an electron discharge device 8 of the twin triode type. Cathodes 9 and 10 are tied together and connected through resistor 13 to a point of ground potential. Anode 14 is connected through resistor 15 to a suitable positive biasing supply. Anode 16 is connected through resistor 17 and primary winding 18 of a pulse transformer 19 to a source of positive D.-C. potential which in this case is the same as that supplying anode 14. Grid 20 is biased positively through resistor 22 and is connected by coupling capacitor 23 to anode 14. Potentiometer 25 is connected from the plate supply source to ground and its arm is tied to grid 7. This multivibrator is typical of all those used in my invention, hence the subscripts A, B, and C are used to denote circuit elements in the three remaining multivibrators which perform functions identical to similarly numbered elements in the first multivibrator. It should be noted, however, that connection is made from terminal 5 through coupling capacitor 26 to grid 7A of vacuum tube 8A and that connection is made from anode 14A of vacuum tube 8A through coupling 33 to grid 7B of vacuum tube 8B and through coupling capacitor 38 to grid 7C of vacuum tube 8C.

One side of secondary winding 45 of pulse transformer 19 is connected directly to ground, the other side being brought to grid 46 of vacuum tube 47. The pulse transformer has also another secondary winding 49 which is connected between grid 50 of vacuum tube 47 and ground. Cathodes 53 and 54 are tied together and connected through the parallel combination of resistor 55 and capacitor 56 to ground. Anodes 59 and 60 are tied together and biased positively through resistor 61. Output terminal 62 is connected to anodes 59 and 60.

In the operation of the circuit, the triode section of tube 8 comprising anode 16, grid 20, cathode 10, which will hereinafter be referred to as the right half of tube 8, as well as the corresponding section of each of tubes 8A, 8B, and 8C is conducting, the other, or left half, of each twin triode being cut off. A positive trigger is impressed on terminal 5 and applied to grids 7 and 7A initiating multivibrator action in tubes 8 and 8A. The left half of each of the two tubes begins to conduct while the right half is cut off. This condition, however, is unstable and will obtain for a length of time depending chiefly upon the time constant of the circuit including resistor 22, capacitor 23, resistors 15 and 13, and the plate resistance of the left half of tube 8. Capacitor 23 discharges through the resistance path until the potential between grid 20 and cathode 10 is such that conduction can again be maintained in the right half of tube 8. When this occurs, the two triodes revert to their initial state and remain thus until receipt of another trigger pulse. Normally, multivibrator 8 will be adjusted to remain in the unstable state for a shorter time than does multivibrator 8A, the duration of the unstable state of each multivibrator throughout the circuit being conveniently adjustable by means of potentiometer 25 or capacitor 23.

Primary winding 18 of transformer 19 being in the plate circuit of the right halves of tubes 8 and 8A, initiation or cessation of current flow in these triodes will cause a pulse of voltage to be induced in secondary windings 45 and 49. These windings are so wound that regardless of the nature of the current change in primary winding 18, a positive voltage pulse will be impressed on one grid of twin triode 47. This tube is normally biased almost to cut-off by plate current flowing through resistor 55. Since both halves of the tube have a common plate load resistor, an increase of current in either half will produce a drop in anode voltage which will appear at terminal 62. Hence, an output pulse will appear for each sharp change of current through the primary of transformer 19.

Since multivibrator 8A has a longer unstable period than multivibrator 8, it is used to actuate multivibrators 8B and 8C. The latter two circuits are similar to the first two multivibrators, each being triggered simultaneously and one having a longer unstable state than the other. Anode 14A which is connected through capacitors 33 and 38 to grids 7B and 7C respectively drops in potential when multivibrator 8A is triggered, remains thus for a short period of time, and then returns abruptly to its original potential. This last change supplies the necessary triggering action for multivibrators 8B and 8C. Capacitors 33 and 38 may be small enough to afford differentiating action together with resistors 25B and 25C to form shorter triggering pulses from the rectangular pulse generated at anode 14A.

After being triggered, multivibrators 8B and 8C go through the same sort of cycle as did multivibrators 8 and 8A, again pulsing the secondary windings of transformer 19. Therefore, a series of short pulses in a sequence which is determined by the length of time each tube remains in an unstable state is obtained at output terminal 62. Pulses similar to but inverted with respect to those appearing at anodes 59 and 60 may be obtained by taking the output from cathodes 53 and 54. In either case the output may be amplified and shaped as is necessary for use as a modulating voltage.

Figure 2:
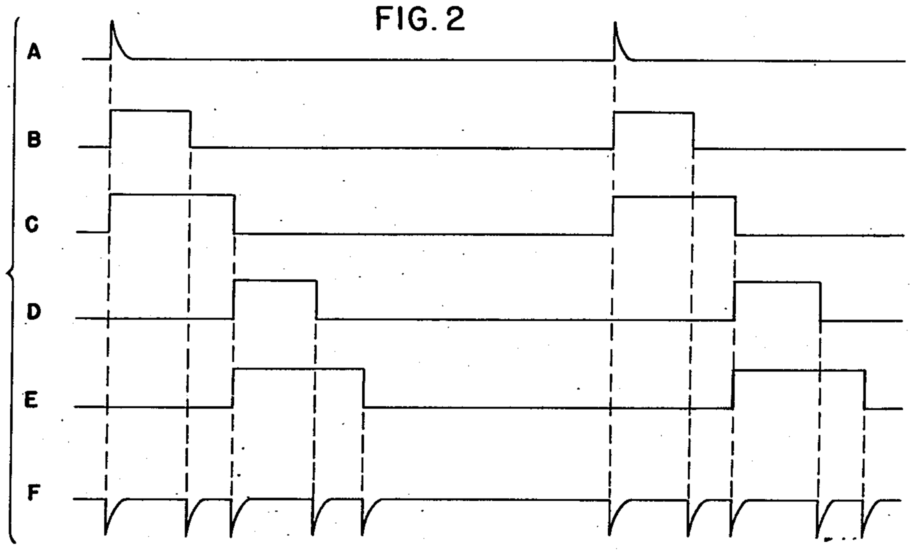
Fig. 2 is a series of voltage wave forms illustrating typical operation of the circuit shown in Fig. 1.

In Fig. 2 are shown in proper time relationship certain of the periodic voltages present in the circuit of Fig. 1 while it is in operation. Curve A is the triggering pulse applied to terminal 5. Curve B is the voltage at anode 16 of multivibrator 8, and curve C is the voltage at anode 16A of multivibrator 8A. It can be seen that the pulses in curves B and C are initiated simultaneously by the triggering pulses of curve A and that the pulses in curve C are slightly longer than those in curve B. The voltages at anodes 14 and 14A, while not shown, are similar to those in curves B and C but the rectangular pulses generated are negative-rather than positive-going. Therefore, the leading edges of the pulses in curves D and E, which represent the voltages at anodes 16B and 16C respectively, are coexistent with the trailing edges of the pulses in curve C although action in multivibrators 8B and 8C is initiated by voltages on anode 14A. As stated hereinabove, each current change in primary winding 18 of transformer 19 will cause a pulse of voltage in secondary windings 45 and 49, these pulses being amplified by the output stage. Hence, there will be an output pulse as shown in curve F corresponding to the leading edge and the trailing edge of each of the pulses in curves B through E. As can be seen, the output pulses form groups, the spacing of the individual pulses within each group being variable with the pulse length of each multivibrator.

It is possible to trigger all four multivibrators simultaneously, therefore the arrangement shown in Fig. 1 is preferable because of the excessive pulse length which would be required of multivibrator 8C were it triggered simultaneously with multivibrator 8. In the latter case, a slight percentage change in pulse length would seriously affect the spacing of the output pulses.

Other such modifications will be apparent to those skilled in the art, and I claim all modifications and adaptations as may fall fairly within the spirit and scope of the hereinafter appended claims.

What I claim is:

1. An electrical voltage pulse generating and coding circuit comprising in combination a plurality of multivibrator pulse generators, means for triggering at least a portion of said multivibrators by an externally generated trigger voltage, means for causing another portion of said multivibrators to be triggered by at least one of the externally triggered multivibrators, a transformer having a primary winding and two secondary windings, said primary winding being common to one of the plate circuits of at least a part of said multivibrators, an output means, and means for connecting the secondary windings of said transformer to said output means so that the short pulses of voltage induced in said secondary windings due to sharp changes in current in said primary winding are impressed on said output means.

2. An electrical circuit for generating voltage pulses in a predetermined sequence including a plurality of multivibrator pulse generators, means for initiating operation of a portion of said multivibrators, means for causing the operation of at least one of said portion of the multivibrators to actuate another portion of said multivibrators, a transformer having primary and secondary windings, means for passing plate current from at least part of said multivibrators through the primary winding of said transformer, and means for obtaining from the secondary winding of said transformer a pulse of voltage each time a sharp change of current occurs in the primary winding.

3. A pulse generating circuit comprising a plurality of pairs of multivibrators, each having a single stable state of conduction, means to simultaneously trigger at least one of said pairs of multivibrators, means responsive to the return to the stable state of a first multivibrator of said triggered pair of multivibrators to simultaneously trigger a succeeding pair of multivibrators, and a plurality of further means, each responsive to the return to the stable state of a first multivibrator of the pair of multivibrators immediately preceding said means to simultaneously trigger the succeeding pair of multivibrators, whereby pairs of multivibrators may be successively rendered unstable.

4. A circuit as set forth in claim 3, including a combining circuit for combining the outputs of at least some of the second multivibrators of each pair.

5. A circuit as set forth in claim 4, wherein said combining circuit includes differentiating means.

6. A circuit as set forth in claim 5, including means for deriving from the output of said differentiating means pulses varying in the same direction from differentiated pulses which vary in opposite directions.

7. A pulse generating circuit comprising a plurality of pairs of multivibrators, each multivibrator having a single stable state of conduction, said pairs being arranged in cascade, corresponding sections of each of said multivibrators being normally conductive, means operative in succession to render simultaneously nonconductive the normally conductive sections of each pair of multivibrators, means in circuit with each pair of multivibrators to provide differing stability recovery times for the normally conductive sections within said pair of multivibrators, means responsive to the changes in conductivity of said normally conductive sections to derive from said sections successive output voltages, and means to differentiate said output voltages.

8. A pulse generating circuit comprising a plurality of pairs of multivibrators forming a consecutive series of multivibrators, an odd and even numbered multivibrator of said series making up each pair of multivibrators, each of said multivibrators having a single stable state of conduction, said pairs of multivibrators being electrically arranged in cascade, alternate multivibrators having equal stability recovery times, the even numbered multivibrators of said series being characterized by a longer recovery time than said odd numbered multivibrators, means to trigger simultaneously a first pair of multivibrators from an external source, means in circuit with said first pair of multivibrators to provide a trigger pulse to trigger simultaneously a second pair of multivibrators, said means being responsive to the return to the stable state of the multivibrator of said first pair having the longer recovery time, and a common output transformer coupled to the plate circuit of the section of each normally conductive multivibrator.

9. A pulse generating circuit comprising a plurality of pairs of multivibrators, each multivibrator having a single stable state of conduction, said pairs being connected in cascade, alternate multivibrators having equal stability recovery times, successive multivibrators having unequal stability recovery times, means to trigger simultaneously the first pair of said multivibrators from an externally generated pulse source, means in circuit with said first pair of multivibrators to provide a trigger pulse to trigger simultaneously said second pair of multivibrators, said means being responsive to the return to the stable state of one of the multivibrators of said first pair, and an output transformer common to the plate circuits of the normally conductive sections of said plurality of multivibrators.

ANDREW B. JACOBSEN.

REFERENCES CITED

The following references are of record in the file of this patent:

UNITED STATES PATENTS

| Number | Name | Date |
|---|---|---|
| 2,132,654 | Smith | Oct. 11, 1938 |
| 2,176,742 | La Pierre | Oct. 17, 1939 |
| 2,210,576 | Fitch | Aug. 6, 1940 |
| 2,398,771 | Compton | Apr. 23, 1946 |
| 2,403,561 | Smith | July 9, 1946 |
| 2,403,873 | Mumma | July 9, 1946 |
| 2,424,481 | McCoy | July 22, 1947 |